United States Patent [19]

Takekoshi et al.

[11] Patent Number: 5,362,837
[45] Date of Patent: Nov. 8, 1994

[54] PREPARATION OF MACROCYCLIC POLYETHERIMIDE OLIGOMERS FROM BIS(TRIALKYLSILYL) ETHERS

[75] Inventors: Tohru Takekoshi, Scotia; Jane M. Terry, Schenectady, both of N.Y.

[73] Assignee: General Electric Company, Schenectady, N.Y.

[21] Appl. No.: 96,393

[22] Filed: Jul. 26, 1993

[51] Int. Cl.$^5$ .................. C08G 8/02; C08G 73/10; C08G 69/26

[52] U.S. Cl. ................... 528/125; 528/21; 528/26; 528/34; 528/126; 528/128; 528/170; 528/171; 528/172; 528/173; 528/174; 528/175; 528/179; 528/185; 528/188; 528/220; 528/229; 528/353; 524/600

[58] Field of Search .............. 528/24, 26, 125, 21, 528/126, 128, 170, 171, 172, 173, 174, 175, 179, 185, 188, 220, 229, 353; 524/600

[56] References Cited

U.S. PATENT DOCUMENTS

| | | | |
|---|---|---|---|
| 3,787,364 | 1/1974 | Wirth et al. | 524/600 |
| 3,833,546 | 9/1974 | Takekoshi et al. | 524/600 |
| 3,847,869 | 11/1974 | Williams, III | 524/600 |
| 4,612,361 | 9/1986 | Peters | 528/185 |
| 4,663,378 | 5/1987 | Allen | 524/600 |
| 4,794,155 | 12/1988 | Woo et al. | 528/125 |
| 4,870,155 | 9/1989 | Matzner et al. | 528/125 |
| 5,229,482 | 7/1993 | Brunelle | 528/185 |

OTHER PUBLICATIONS

Bryant et al., "A-B Polyetherimides", Abstracts of the Fourth International Conference on Polyimides, pp. 69-71, Oct.30-Nov. 1, (1991).

*Primary Examiner*—Morton Foelak
*Assistant Examiner*—P. Hampton-Hightower
*Attorney, Agent, or Firm*—William H. Pittman

[57] ABSTRACT

Macrocyclic polyetherimide oligomer compositions are prepared by a displacement reaction at a temperature in the range of about 200°-225° C. between at least one fluorinated aromatic phthalimide and at least one phenolic trialkylsilyl ether compound. Preferably, a bisfluoroimide and a bis-trialkylsilyl ether of a dihydroxyaromatic compound such as resorcinol are employed. The reaction is conducted by maintaining reagents A and B in high dilution in a dipolar aprotic organic liquid such as N-methylpyrrolidone, and in the presence of a catalytic amount of at least one substantially soluble fluoride. Preferably, a mixture of reagents A and B is added to solvent containing the catalyst.

13 Claims, No Drawings

PREPARATION OF MACROCYCLIC POLYETHERIMIDE OLIGOMERS FROM BIS(TRIALKYLSILYL) ETHERS

This invention relates to the preparation of macrocyclic oligomer compositions, and more particularly to the preparation of macrocyclic polyetherimide oligomers.

Copending, commonly owned application Ser. No. 08/080,550 filed Jun. 24, 1993, now abandoned, discloses a class of macrocyclic polyimide oligomer compositions not containing spiro(bis)indane moieties. Said compositions may be converted to linear polyimides. By reason of the low viscosities of the oligomer compositions in comparison to the linear polymers, said compositions are capable of employment in areas from which polyimides have previously been barred.

According to said application, the macrocyclic polyimide oligomers are prepared by the reaction of equimolar amounts of at least one tetracarboxylic acid or its dianhydride and at least one diamine. Said reaction requires pseudo-high dilution conditions; i.e., maintenance of the reagents at high dilution. Since the condensation reaction between the acid and the diamine is slow, the rate of reagent introduction must also be slow and the reaction may take several hours to go to completion.

In recent years, there has been an increase in interest in the preparation of polyetherimides, a subgenus of polyimides, by the reaction of substituted bis-phthalimides with derivatives, most often salts, of dihydroxyaromatic compounds. Reference is made, for example, to copending, commonly owned application Ser. No. 07/661,947. U.S. Pat. No. 5,229,482.

It has now been discovered that macrocyclic polyetherimide oligomer compositions, capable of conversion to linear polyetherimides as described in said application, can be prepared by the reaction of fluorinated bis-phthalimides with trialkylsilyl ethers of dihydroxyaromatic compounds under appropriate conditions. As in the earlier methods for preparation of such compositions, the required conditions include pseudo-high dilution.

The invention is a method for preparing a composition comprising macrocyclic polyetherimide oligomers which comprises effecting a displacement reaction between (A) at least one fluorinated aromatic phthalimide and (B) at least one phenolic trialkylsilyl ether compound, each of reagents A and B having two moieties selected from the group consisting of fluorinated phthalimide and trialkylsilyl ether moieties and the molar proportions of trialkylsilyl ether and fluorinated phthalimide moieties being equal;

reagents A and B being maintained throughout the reaction in high dilution in a dipolar aprotic organic liquid;

said reaction being conducted at a temperature in the range of about 200°–225° C. in a dipolar aprotic solvent, in the presence of a catalytic amount of at least one substantially soluble fluoride selected from the group consisting of alkali metal, alkaline earth metal and quaternary ammonium fluorides.

The fluorinated aromatic phthalimides employed as reagent A in the method of this invention include the so-called "AA-type" (i.e., symmetrical) bis-phthalimides having the formula

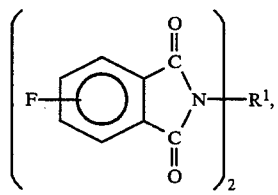

wherein $R^1$ is a $C_{6-20}$ divalent aromatic hydrocarbon or halogenated hydrocarbon radical, a $C_{2-20}$ alkylene or cycloalkylene radical or a divalent radical of the formula

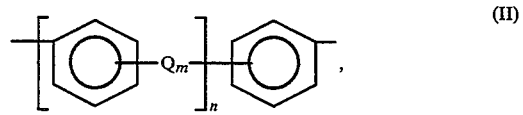

in which each Q is independently linear or branched $C_{2-8}$ alkylene, $-O-$, $-S-$, $-C_6H_4-$ (preferably m- or p-),

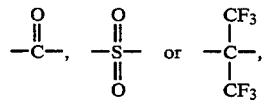

m is 0 or 1 and n is about 1–4. The linkages with benzene rings are preferably in the meta or para positions. Such compounds are known; reference is made, for example, to U.S. Pat. Nos. 3,787,364 and 3,847,869.

Also included are the "AB-type" asymmetrical fluorophthalimide trialkylsilyl ethers of the formula

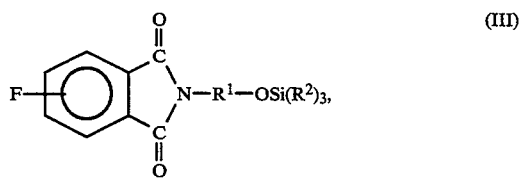

wherein $R^2$ is an alkyl radical, preferably a primary or secondary $C_{1-4}$ alkyl radical and most preferably methyl, and $R^1$ is as previously defined. They are also known, being disclosed in Bryant et al., *Abstracts, 4th International Conf. Polyimides, Soc. Plast. Eng.*, Ellenville, N.Y., November 1991, p. 1169.

Reagent B is at least one phenolic trialkylsilyl ether compound. Said compounds include "BB-type" and "AB-type" compounds, i.e., symmetrical bis-trialkylsilyl ethers of dihydroxyaromatic compounds and compounds of formula IV, provided that the molar proportions of trialkylsilyl ether and fluorinated phthalimide moieties are equal so that formation of macrocyclic polyetherimide oligomers is possible.

Typical "AA-type" trialkylsilyl ethers include those of the formula

wherein $R^3$ is similar to $R^1$; i.e., is a $C_{6-20}$ divalent aromatic hydrocarbon or halogenated hydrocarbon radical, a $C_{2-20}$ alkylene or cycloalkylene radical or a divalent radical of the formula

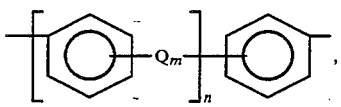

(II)

in which each Q is independently linear or branched $C_{2-8}$ alkylene, —O—, —S—, —$C_6H_4$— (preferably m- or p-),

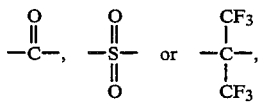

m is 0 or 1 and n is about 1–4. For reasons of availability and particular suitability for the purposes of the invention, the preferred bis-trialkylsilyl ethers are those of resorcinol and catechol. Still more preferably, the trialkylsilyl group is the aforementioned $Si(R^2)_3$ group.

Trialkyisilyl ethers of the foregoing types are also known compounds. The bis-ethers are disclosed, for example, in *Kricheldorf, Makromol. Chem., Makrormol. Symp.*, 1992, 365.

The method of the invention further requires a dipolar aprotic solvent in which a reaction can be conducted at a temperature in the range of about 200°–225° C. Particularly suitable solvents are N-methylpyrrolidone and N-cyclohexylpyrrolidone, especially the former. Other solvents which may be employed include dimethylformamide, dimethylacetamide and dimethylsulfoxide; however, by reason of their low boiling points it may be necessary to conduct the reaction under pressure if they are employed.

Also required is a catalyst, which is at least one fluoride selected from the group consisting of alkali metal, alkaline earth metal and quaternary ammonium fluorides which are soluble in the dipolar aprotic solvent employed. Particularly preferred are the alkali metal fluorides, and especially cesium fluoride by reason of its high solubility. A catalytic amount thereof, typically about 3–10 and preferably about 3–5 mole percent based on reagent A, is employed.

According to the invention, reagents A and B are contacted with the catalyst in a state of high dilution in the solvent. This is typically achieved by dissolving said reagents together or separately in the solvent and adding the resulting solution or solutions to further solvent in which the catalyst is dissolved.

The proportions of the reagents are such as to maintain equimolar proportions of trialkylsilyl ether and fluorinated phthalimide moieties. When "AB-type" reagents are exclusively employed, the proportions will inherently be equimolar. However, when any proportion of the reaction mixture includes "AA-type" and "BB-type" reagents, the proportions of said moieties must also be equimolar.

It is possible to achieve this by employing two reagent solutions and metering each into the reaction vessel at equal rates. However, accurate metering is often difficult and it is therefore preferred to prepare a single solution of both reagents and feed it into the reaction vessel containing the catalyst solution, the latter being maintained at the reaction temperature of about 200°–225° C. Under these conditions, reaction begins when the reagents contact the catalyst. Since the reaction is rapid, reagents A and B are inherently maintained in a state of high dilution until the reaction is complete.

Following completion of the reaction, the macrocyclic polyetherimide oligomers may be isolated by conventional means. These may include such operations as solvent extraction and vacuum stripping of solvent followed by mixing with a non-solvent for purification.

The method of this invention is illustrated by the following examples.

Example 1

A solution of 4.4287 grams (7.525 mmol.) of 1,3-bis[4-(3-fluorophthalimido)phenoxy]benzene prepared by the reaction of 3-fluorophthalic anhydride with 1,3-bis(4-aminophenoxy)benzene, 1.9150 grams (7.525 mmol.) of resorcinol bis-trimethylsilyl ether and 85 ml. of purified N-methylpyrrolidone was prepared by heating a mixture of these compounds at 90° C. for 50 minutes. The solution was transferred to an oil-jacketed addition funnel maintained at 100° C., and the funnel was fitted to a 300-ml. three-necked flask containing 54.2 mg. (0.35 mmol.) of cesium fluoride in solution in 10 ml. of N-methylpyrrolidone. The contents of the flask were stirred in a nitrogen atmosphere and heated at 215°–220° C. in an oil bath, and the solution in the addition funnel was added dropwise over 3 hours. Heating was continued for 30 minutes when addition was complete.

The reaction mixture was cooled and concentrated by vacuum stripping. Methanol, about 100 ml., was added to the residue and the mixture was stirred for 3 hours at room temperature and filtered. The residue (4.98 grams, 88% of theoretical) was washed with methanol and dried. It was shown by high pressure liquid chromatography and field desorption mass spectrometry to comprise the desired macrocyclic polyetherimide oligomer composition, including compounds with degrees of polymerization (DP) from 2 to about 8.

EXAMPLES 2–6

The procedure of Example 1 was repeated, employing bis-fluorophthalimides prepared by reaction of various fluorophthalic anhydride isomers with various diamines and in Example 6, catechol in place of resorcinol. The results are given in the following table.

| Example | Fluorophthalic anhydride isomer | Diamine | Macrocyclic oligomer crude yield, % | Minimum DP |
|---|---|---|---|---|
| 2 | 3 | m-Phenylenediamine | 91 | 1 |
| 3 | 4 | m-Phenylenediamine | 97 | — |
| 4 | 4 | 4-Aminophenyl ether | 98 | 1 |
| 5 | 4 | 1,3-bis(4-Aminophenoxy)benzene | 95 | 1 |
| 6 | 4 | 1,3-bis(4-Aminophenoxy)benzene | 98 | — |

What is claimed is:

1. A method for preparing a composition comprising macrocyclic polyetherimide oligomers which comprises effecting a displacement reaction between (A) at least one fluorinated aromatic phthalimide and (B) at least one phenolic trialkylsilyl ether compound, each of reagents A and B having two moieties selected from the group consisting of fluorinated phthalimide and trialkylsilyl ether moieties and the molar proportions of trialkylsilyl ether and fluorinated phthalimide moieties being equal;
reagents A and B being maintained throughout the reaction in high dilution in a dipolar aprotic organic liquid;
said reaction being conducted at a temperature in the range of about 200°–225° C. in a dipolar aprotic solvent, in the presence of a catalytic amount of at least one substantially soluble fluoride selected from the group consisting of alkali metal, alkaline earth metal and quaternary ammonium fluorides.

2. A method according to claim 1 wherein both reagent A and reagent B comprise, at least in part, at least one asymmetrical fluorophthalimide trialkylsilyl ether of the formula

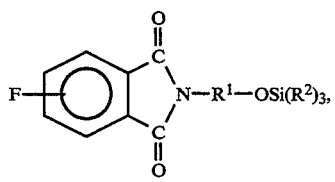
(III)

wherein $R^2$ is an alkyl radical and $R^1$ is a $C_{6-20}$ divalent aromatic hydrocarbon or halogenated hydrocarbon radical, a $C_{2-20}$ alkylene or cycloalkylene radical or a divalent radical of the formula

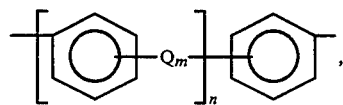
(II)

in which each Q is independently linear or branched $C_{2-8}$ alkylene, —O—, —S—, —$C_6H_4$—,

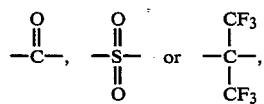

m is 0 or 1 and n is about 1–4.

3. A method according to claim 1 wherein reagent A has the formula

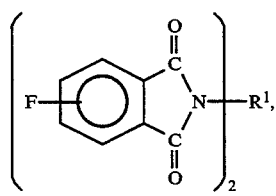
(I)

wherein $R^1$ is a $C_{6-20}$ divalent aromatic hydrocarbon or halogenated hydrocarbon radical, a $C_{2-20}$ alkylene or cycloalkylene radical or a divalent radical of the formula

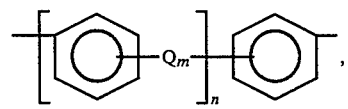
(II)

in which each Q is independently linear or branched $C_{2-8}$ alkylene, —O—, —S—, —$C_6H_4$—,

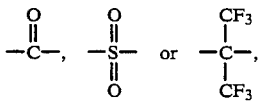

m is 0 or 1 and n is about 1–4; and reagent B is a bis-trialkylsilyl ether of a dihydroxyaromatic compound of the formula

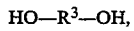
HO—$R^3$—OH,      (IV)

wherein $R^3$ is a $C_{6-20}$ divalent aromatic hydrocarbon or halogenated hydrocarbon radical, a $C_{2-20}$ alkylene or cycloalkylene radical or a divalent radical of the formula

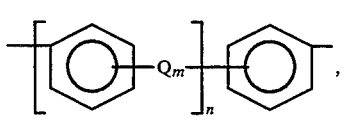
(II)

in which each Q is independently linear or branched $C_{2-8}$ alkylene, —O—, —S—, —$C_6H_4$—,

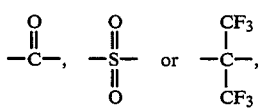

m is 0 or 1 and n is about 1–4.

4. A method according to claim 3 wherein $R^2$ is methyl.

5. A method according to claim 3 wherein $R^1$ is

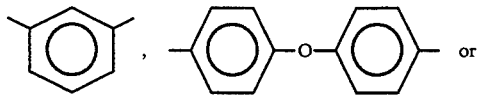
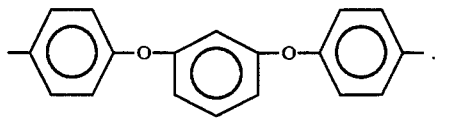

6. A method according to claim 3 wherein $R^3$ is m-phenylene.

7. A method according to claim 3 wherein $R^3$ is o-phenylene.

8. A method according to claim 5 wherein the amount of catalyst is about 3–10 mole percent based on reagent A.

9. A method according to claim 8 wherein the catalyst is an alkali metal fluoride.

10. A method according to claim 9 wherein the catalyst is cesium fluoride.

11. A method according to claim 3 wherein the solvent is N-methylpyrrolidone.

12. A method according to claim 3 wherein reagents A and B are individually or separately dissolved in a portion of the solvent and the resulting solution or solutions is added to further solvent containing catalyst.

13. A method according to claim 12 wherein a single solution of reagents A and B is added to the catalyst solution.

* * * * *